(12) United States Patent
Itabashi

(10) Patent No.: US 6,469,772 B1
(45) Date of Patent: Oct. 22, 2002

(54) LIGHT SOURCE UNIT FOR OPTICAL SCANNING APPARATUS USED IN IMAGE FORMING APPARATUSES

(75) Inventor: Akihisa Itabashi, Mitaka (JP)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 09/608,165

(22) Filed: Jun. 30, 2000

(30) Foreign Application Priority Data

Jun. 30, 1999 (JP) ............................................. 11-185800
Oct. 28, 1999 (JP) ............................................. 11-306478

(51) Int. Cl.[7] ........................ G03B 27/58; G03B 27/50; G03B 27/54; G02B 26/08; B41J 15/14
(52) U.S. Cl. ............................. 355/47; 355/49; 355/67; 359/204; 347/242
(58) Field of Search ................................ 355/47, 49, 67, 355/70, 71; 347/238, 243, 244; 359/204, 205

(56) References Cited

U.S. PATENT DOCUMENTS 5,831,758 A * 11/1998 Sakai et al. .................. 359/204
6,069,723 A * 5/2000 Aoki .......................... 359/204
6,181,363 B1 * 1/2001 Satoh .......................... 359/204

* cited by examiner

Primary Examiner—Russell Adams
Assistant Examiner—Peter B. Kim
(74) Attorney, Agent, or Firm—Oblon, Spivak, McClelland, Maier & Neustadt, P.C.

(57) ABSTRACT

A multi-beam scanning apparatus including a light source unit having a plurality of light emitting parts configured to emit a plurality of divergent light fluxes, a deflector configured to deflect the plurality of divergent light fluxes emitted from the light source unit, and an imaging system configured to couple the plurality of divergent light fluxes from the light source unit with the deflector and to condense the deflected plurality of light fluxes into optical spots on a surface to be scanned. The light source unit is configured so the optical spots are separated from each other in a sub-scanning direction on the surface to be scanned, and optical axes of the light fluxes emitted from the plurality of light emitting parts are angled in a substantially same direction in the sub-scanning direction relative to optical axes of respective corresponding coupling lenses.

53 Claims, 8 Drawing Sheets optical axis of coupling lens optical axis of optical system

LIGHT SOURCE UNIT FOR OPTICAL SCANNING APPARATUS USED IN IMAGE FORMING APPARATUSES

CROSS REFERENCE TO RELATED APPLICATIONS

The present application claims priority and contains subject matter related to Japanese Patent Applications No. 11-185800 and No. 11-306478 filed in the Japanese Patent Office on Jun. 30, 1999 and Oct. 28, 1999, respectively, and the entire contents of which are hereby incorporated by reference.

BACKGROUND OF THE INVENTION

1. Field of the Invention

The present invention relates to a light source unit for an optical scanning apparatus used in image forming apparatuses.

2. Discussion of the Background

Image forming apparatuses using an optical scanning apparatus for writing image information are widely known as digital copying machines, optical printers, optical plotters and optical plate making machines.

To increase an image forming speed in such image forming apparatuses, it is necessary to increase the image writing speed of the optical scanning apparatus. When an optical scanning apparatus uses only one optical beam for optical scanning to increase the image writing speed, a deflector for deflecting the single beam must be rotated at a high speed. Such a high-speed rotating deflector is relatively expensive. In addition, a noise preventing device is necessary to reduce the noise caused by the high speed rotation of the deflector through the air. Therefore, an optical scanning apparatus capable of rotating a deflector at a high speed is relatively expensive.

As a method of increasing the image writing speed without increasing the rotation speed of the deflector, a multi-beam scanning method is known. In this instance, a plurality of scanning lines are simultaneously scanned by simultaneously deflecting a plurality of optical beams.

However, in the multi-beam scanning method, in comparison with a single beam scanning method, a scanning line as a locus of scanning with an optical spot is easily and remarkably curved, Thereby, the scanning line pitch deviation (a difference between maximum and minimum values of an interval of neighboring scanning lines) is large.

When the scanning line pitch deviation exceeds a certain level in an image formed as a result of optical scanning, the density unevenness is large and visible, thus deteriorating the quality of the image.

SUMMARY OF THE INVENTION

Accordingly, one object of the present invention is to solve the above-noted and other problems.

Another object of the present invention is to provide a light source unit in which a scanning line pitch deviation is reduced and deterioration of the image quality is reduced.

To achieve these and other objects, the present invention provides a novel multi-beam scanning apparatus including a light source unit having a plurality of light emitting parts configured to emit a plurality of divergent light fluxes, a deflector configured to deflect the plurality of divergent light fluxes emitted from the light source unit, and an imaging system configured to couple the plurality of divergent light fluxes from the light source unit with the deflector and to condense the deflected plurality of light fluxes into optical spots on a surface to be scanned. The light source unit is configured so the optical spots are separated from each other in a sub-scanning direction on the surface to be scanned. Further, optical axes of the light fluxes emitted from the plurality of light emitting parts are angled in a substantially same direction in the sub-scanning direction relative to optical axes of a plurality of coupling lenses respectively corresponding to the plurality of light emitting parts.

According to another aspect of the present invention, projecting shadows of optical axes of light fluxes emitted from the plurality of emitting parts in a sub-scanning cross section are angled in a substantially same direction in the sub-scanning direction relative to optical axes of a plurality coupling lenses respectively corresponding to the plurality of light-emitting parts.

According to still another aspect of the present invention, the imaging system includes a fist imaging system configured to couple and guide the plurality of diverging light fluxes from the light source unit to the deflector, and a second imaging system configured to condense the plurality of light fluxes deflected by the deflector into the optical spots on the surface to be scanned. In addition, when a focal distance of a coupling lens of the first imaging system is f1, a focal distance of a line image forming system is f2, an imaging lateral magnification ratio of the second imaging system in the sub-scanning direction is $\beta$ and $\delta$ is an angle formed by a projecting shadow of an emerging optical axis of each light flux emitted from the plurality of light emitting parts in a sub-scanning cross section and an optical axis of a corresponding coupling lens, a condition: $(f2/f1) \cdot |\beta| \cdot 2 \cdot |\delta| < 2.2$ (deg.) is satisfied.

According to still another aspect of the present invention, a light source apparatus for an optical scanning apparatus includes a light source unit having a plurality of light emitting parts arranged such that optical spots formed by the light source unit on a surface to be scanned are spaced from each other at an equal intervals in a sub-scanning direction, a coupling lens configured to couple the divergent light flux from each light emitting part with a deflector, a base member configured to support at least one of the light emitting parts and at least one of the coupling lens, and an angle adjusting device configured to adjust an angle of the optical source apparatus relative to an optical axis of the coupling lens in the sub-scanning direction.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DETAILED DESCRIPTION OF THE PREFERRED EMBODIMENTS

Figure 1A:
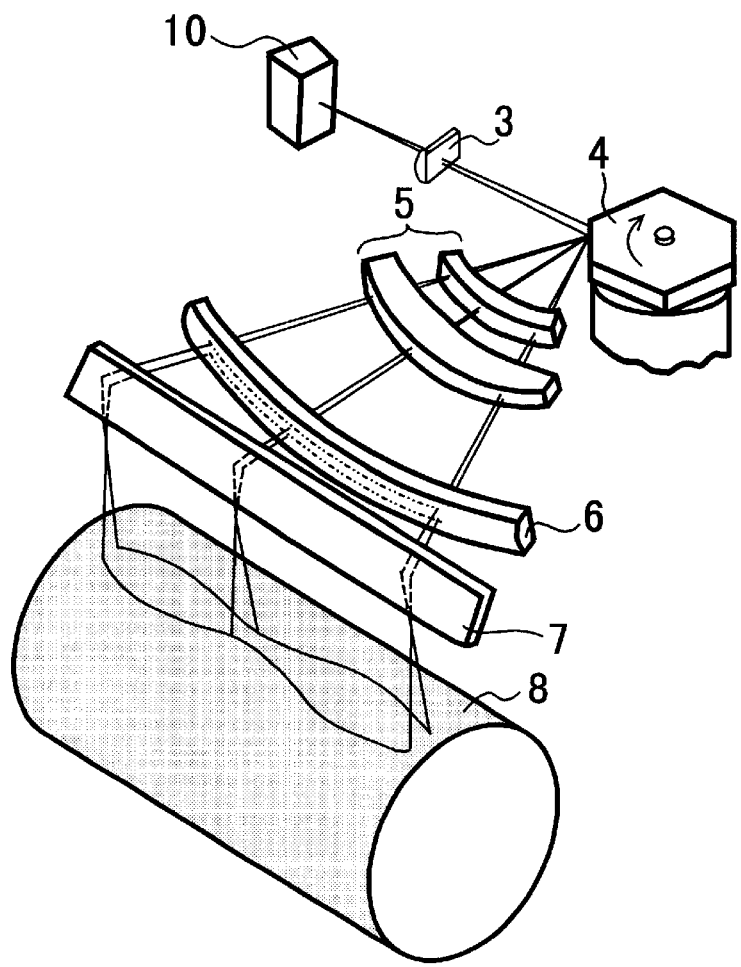
FIG. 1(a) is a schematic draw illustrating a construction of a multi-beam scanning apparatus according to an embodiment of the present invention.

Referring now to the drawings, wherein like reference numerals designate identical or corresponding parts throughout the several views, preferred embodiments of the present invention are described.

FIG. 1(a) is a schematic of a multi-beam scanning apparatus according to an embodiment of the present invention. In FIG. 1(a), a light source apparatus 10 includes a light source unit having a plurality of light emitting parts and a coupling lens for coupling a divergent light flux emitted from each light emitting part with a subsequent system.

In this embodiment, the light source unit has two light emitting parts. However, the light source unit may have three or more light emitting parts, The coupling lens converts the divergent light flux into a light flux shape suitable for a subsequent optical system, for example, into a weak divergent or converging light flux. In this embodiment, each light flux coupled by the coupling lens is emitted from the light source apparatus 10 as a parallel light flux, and is formed into a substantially linear image elongated in the main scanning direction by a cylindrical lens 3 as a line image forming system. The cylindrical lens 3 is disposed in a vicinity of a deflecting reflective surface of a rotating multi-faced mirror 4 as a deflector. For the deflector, a rotating single-faced or two-faced mirror may be employed. For the line image forming system, a cylindrical concave mirror may also be used, Further, the line image forming system may be provided for each of the plurality of light fluxes or commonly for the plurality of light fluxes. The two light fluxes deflected by the reflective surface of the deflector 4 pass through a fθ lens 5 and an elongated lens 6 while being deflected at an equiangular velocity via a constant velocity rotation of the multi-faced mirror 4. The light fluxes are condensed by the lenses 5 and 6 and folded by a light path folding mirror 7 into optical spots on a photoconductive surface of a photoconductor 8 serving as a surface to be scanned. Thereby, the optical spots scans two scanning lines on the surface to be scanned. The two optical spots are spaced from each other by a desired distance (i.e., a scanning line pitch).

That is, a relative positional relationship between light emitting parts of a light source unit is determined so a desired scanning line pitch is achieved according to a synthesizing magnification M in the sub-scanning direction of an imaging system provided between the light source unit and the surface to be scanned, which in this embodiment are the coupling lens, the cylindrical lens 3, the fθ lens 5 and the elongated lens 6.

Figure 1B:
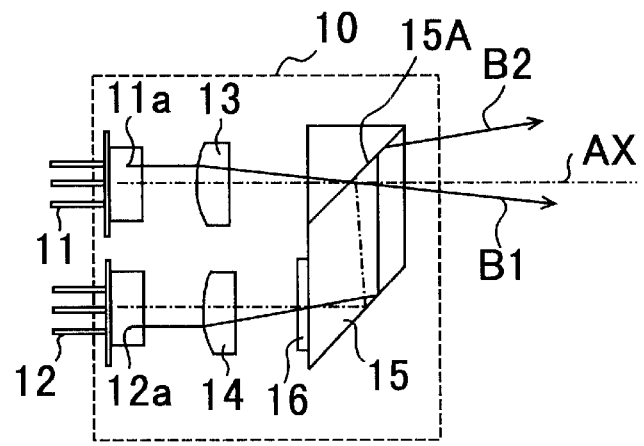
FIG. 1(b) is a diagram illustrating a construction of a light source unit of the multi-beam scanning apparatus.

As illustrated in FIG. 1(b), the light source apparatus 10 converts divergent light fluxes from two semiconductor lasers 11, 12 into parallel light fluxes by coupling them with corresponding coupling lenses 13, 14, respectively. The light source apparatus 10 synthesizes the coupled light fluxes with a beam synthesizing prism 15 into a synthesized beam. The beam synthesizing prism 15 includes a polarizing separation film 15A, and a light flux from the coupling lens 13 passes through the polarizing separation film 15A. The light flux from the coupling lens 14 is rotated 90 degrees by a ½ wavelength plate 16, and is then sequentially reflected by a prism surface and the polarizing separation film 15A to emerge from the beam synthesizing prism 15.

The optical axes (illustrated by chain lines) of the coupling lenses 13, 14 are parallel to each other and are synthesized by the beam synthesizing prism 15 into a synthesized optical axis AX as illustrated in FIG. 1(b).

In FIG. 1(b), the vertical direction corresponds to a sub-scanning direction. Light emitting parts 11a, 12a of the semiconductor lasers 11, 12 are deviated oppositely to each other from respective light axes of the corresponding coupling lenses 13, 14 in the sub-scanning direction. Thereby, light fluxes B1, B2 synthesized by the beam synthesizing prism 15 are angled with respect to each other in the sub-scanning direction As for the light source unit, any known light source including the one illustrated in FIG. 1(b) can be used. For example, the light source unit may be configured to include a semiconductor laser array in which a plurality of light emitting parts are monolithically arranged so a plurality of diverging light fluxes emitted from the light emitting parts are coupled with a common coupling lens.

Figure 2:
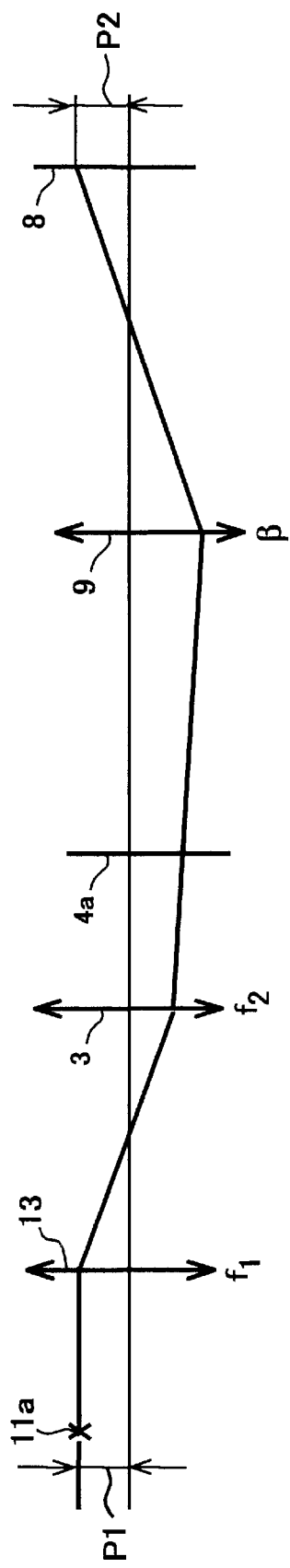
FIG. 2 is a diagram for explaining an imaging function in the sub-scanning direction of an imaging system of the multi-beam scanning apparatus with respect to a light emitted from a light emitting part of a semiconductor laser of the light source unit.

FIG. 2 is a diagram for explaining an imaging function in the sub-scanning direction with reference to FIGS. 1(a) and 1(b). In the diagram, reference number 4a denotes a deflecting surface of the rotating multi-faced mirror 4. Reference number 9 denotes a lens in which the fθ lens 5 and the elongated lens 6 are synthesized for convenience sake.

Referring to the figure, a relationship: P1=(f1/f2)P2/|β| is satisfied when a distance of the light emitting part 11a from an optical axis of a coupling lens in the sub-scanning direction is P1, a focal length of the coupling lens 13 is f1, a focal length of the cylindrical lens 3 as a line image forming system is f2, a lateral imaging magnification in the sub-scanning direction of the synthesized optical system 9 of an fθ lens and an elongated lens is β, and a distance between an imaging position of a light flux emitted from the light emitting part 11a on a surface to be scanned and the optical axis in the sub-scanning direction is P2.

An image forming apparatus using an optical scanning apparatus forms an image by scanning an optical spot on a surface. If an interval between neighboring scanning lines is not uniform, i.e., if a scanning line pitch deviation exists, overlapping of an image forming material (toner or ink) in the sub-scanning direction becomes uneven according to the position in a scanning line, which causes an uneven density in a formed image.

According to an experiment performed by the present inventor, uneven overlapping of toner is not recognizable by human eyes if the scanning line pitch deviation between the neighboring scanning lines (i.e., a difference between maximum and minimum values of an interval between neighboring scanning lines) is smaller than 1/6 of an optical spot diameter ω in the sub-scanning direction. The sub-scanning direction optical spot diameter ω is a diameter of an area of an optical spot, where the light intensity distribution in the sub-scanning direction approximates to a gauss distribution, the maximum value is 1, and the light intensity is greater than $1/e^2$.

Figure 3A:
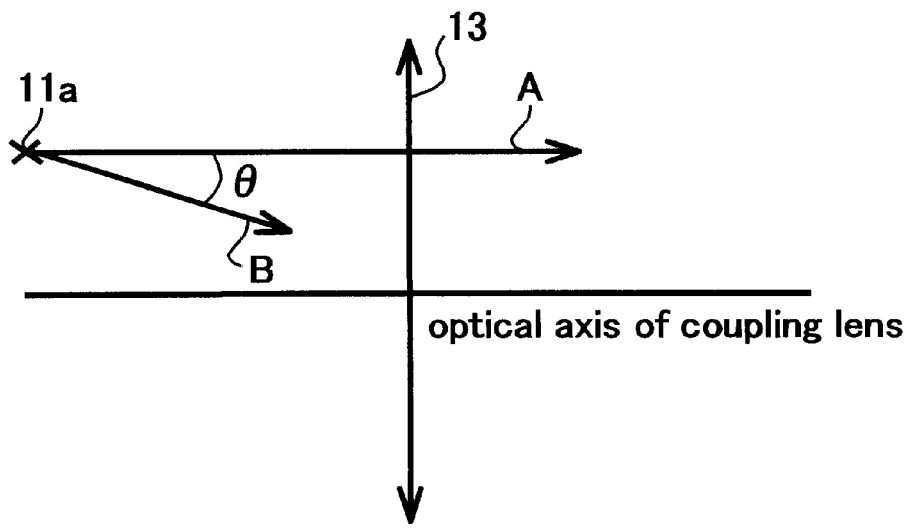
FIGS. 3(a) and 3(b) are diagrams illustrating directions of optical axes of emerging light fluxes from the light emitting part for explaining a cause of generating a scanning line pitch deviation.

FIG. 3(a) is a diagram for explaining a direction of an optical axis of an emerging light flux from the light emitting part 11a. The emerging optical axis corresponds to a direction in which the light intensity of a diverging light flux emerged from the light emitting part reaches a maximum (i.e., in which the light intensity in the gauss distribution reaches the maximum).

It is preferable the direction of the optical axis of a light flux emerged from the light emitting part 11a is parallel to the optical axis of the coupling lens 13 corresponding to the light emitting part 11a. That is, a direction denoted by A in FIG. 3(a). However, because of unavoidable assembly and adjusting errors of the semiconductor laser 11 and corresponding coupling lens 13, the emerging optical axis may be declined (for example in a direction B illustrated in the figure) by an angle θ relative to the optical axis of the coupling lens 13. If an emerging light axis of a light flux has a finite angle θ relative to the optical axis of the coupling lens 13 in the sub-scanning direction as noted above, a scab line on a surface to be scanned is not straight, but rather is curved. That is, a so-called scanning line curve occurs. Such a scanning line curve causes a scanning line pitch deviation in a scanning apparatus.

Figure 3B:
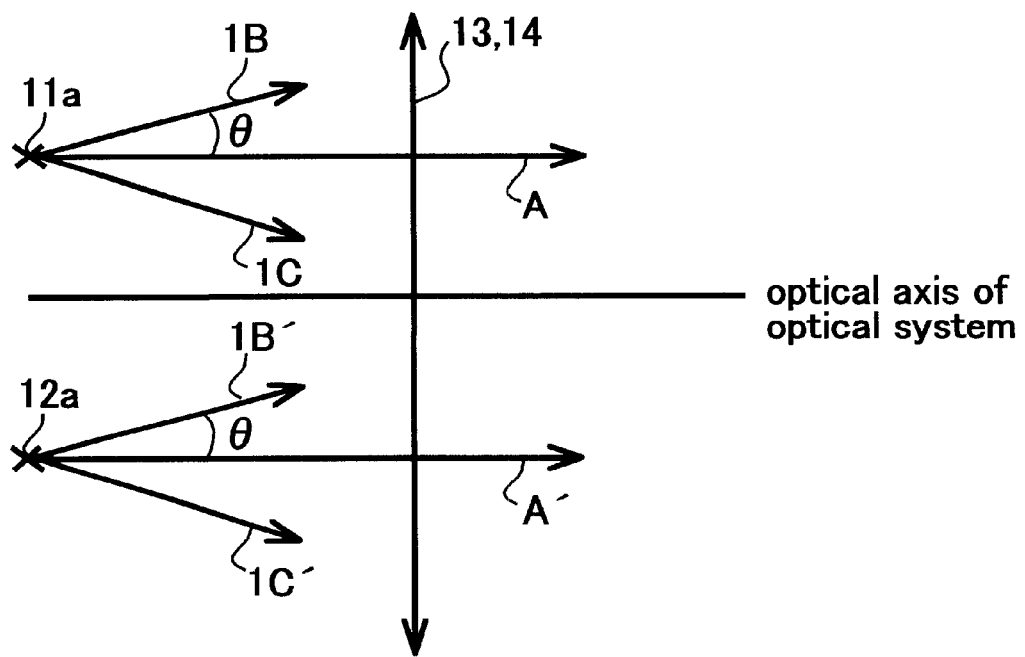

In a two-beam scanning apparatus as illustrated in FIGS. 1(a) and 1(b), a light source unit includes two light emitting parts and two corresponding coupling lenses. From the standpoint of the positional relationship between the light emitting parts and the coupling lenses, as illustrated in FIG. 3(b), it is preferable the directions of the optical axes of light fluxes emitted from the light emitting parts 11a, 12a relative to an optical axis of an optical system (corresponding to the optical axis AX in FIG. 1(b), which is synthesized by the beam synthesizing prism 15) are parallel to the optical axis of the optical system, i.e., A and A' directions, respectively. However, in reality, due to the assembly or adjustment errors as described above, the direction of an optical axis of a light flux emerging from the light emitting part 11a is generally declined relative to the optical axis in a 1B or 1C direction with a finite angle. Further, the direction of the optical axis of a light flux emerging from the light emitting part 12 is declined in a 1B' or 1C' direction with a finite angle, as illustrated in the figure.

Accordingly, there are two cases of optical axes of light fluxes emerging from the light emitting parts 11a, 12a. One in which the two light fluxes are angled in a same direction relative to the optical axis of the optical system (i.e., the optical axis of a coupling lens corresponding to each light emitting part), such as in the 1B and 1B' directions or in the 1C and 1C' directions, and the other in which the two light fluxes are angled in opposite directions such as in the 1B and 1C' directions or in the 1C and 1B' directions.

For simplicity purposes, it is assumed the 1B and 1B' directions have an angle a relative to the optical axis of the optical system and the 1C and 1C' directions have an angle −θ relative to the optical axis.

Figure 4A:
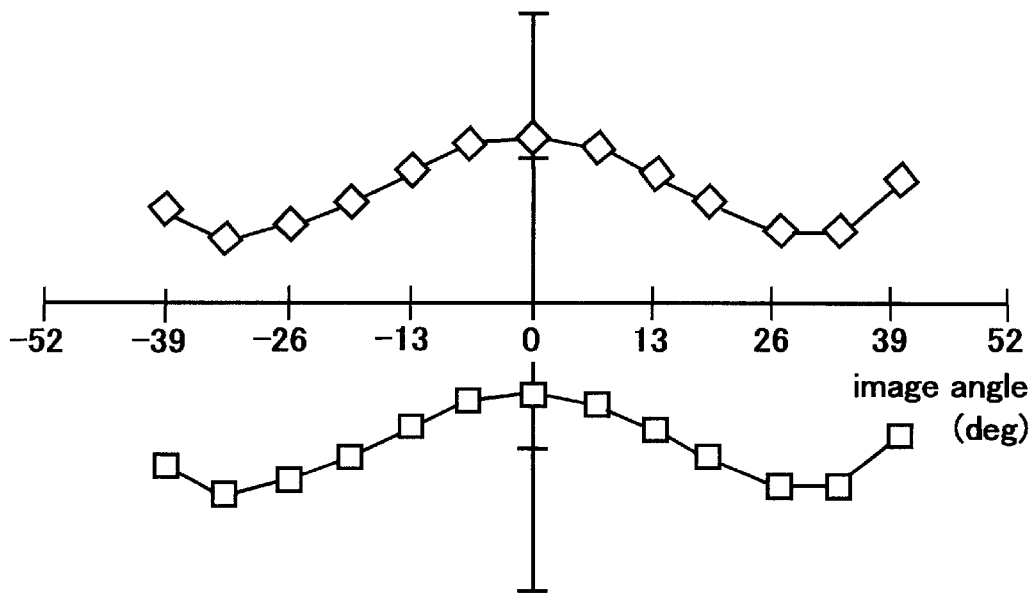
FIGS. 4(a) and 4(b) are diagrams illustrating shapes of scanning lines and a scanning line pitch deviation when optical axes of light fluxes emerging from two light emitting parts are respectively angled relative to optical axes of respectively corresponding coupling lenses in a substantially same direction in the sub-scanning direction.
Figure 4B:
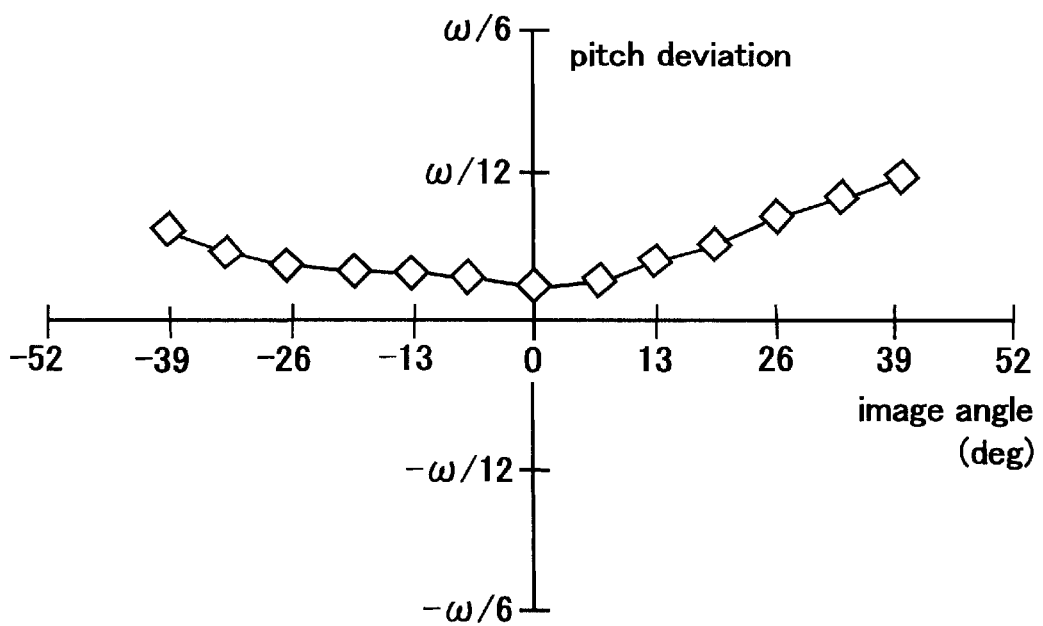

When the optical axes of light fluxes emerging from the light emitting parts 11a and 12a are in the 1B and 1B' or 1C and 1C' directions, the scanning line scanned with optical spots formed by these two light fluxes are curved as indicated in FIG. 4(a). As illustrated, the curves are similar to each other. In FIG. 4(a), the position of an optical spot in the sub-scanning direction (indicated by the vertical axis) is plotted for each image angle (image height in the main scanning direction). In his case, the scanning line pitch difference (the deviation of the scanning line interval from the designed value) for each image angle is as illustrated in FIG. 4(b), and the scanning line pitch deviation is not so large.

Figure 5A:
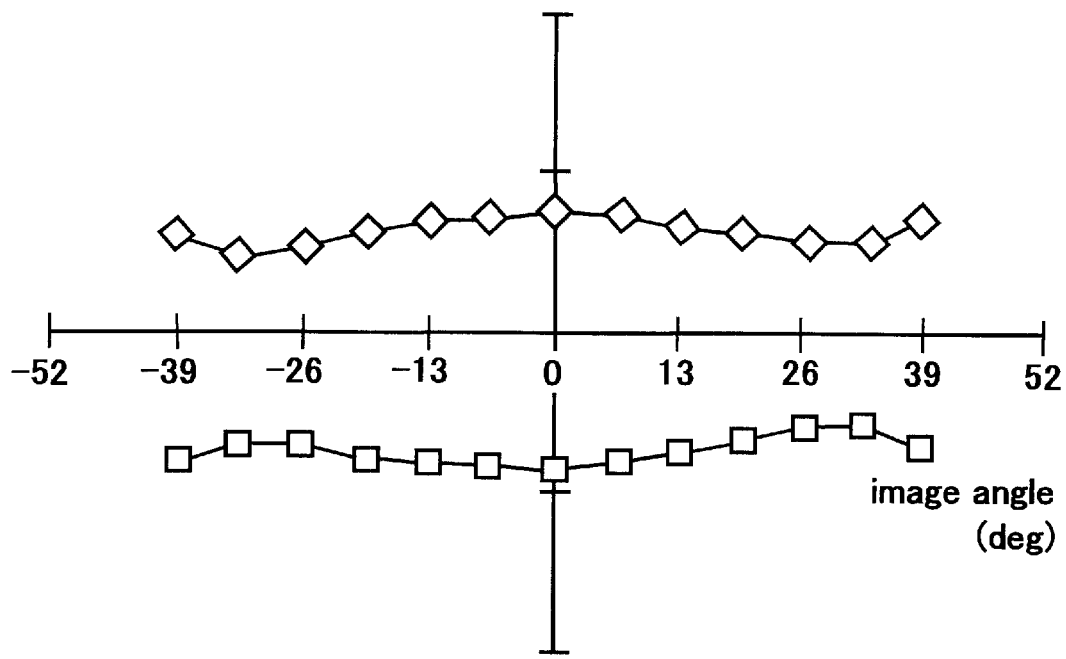
FIGS. 5(a) and 5(b) are diagrams illustrating shapes of scanning lines and a scanning line pitch deviation when optical axes of light fluxes emerging from two light emitting parts are respectively angled relative to the optical axis of respectively corresponding coupling lenses in directions opposite to each other in the sub-scanning direction.
Figure 5B:
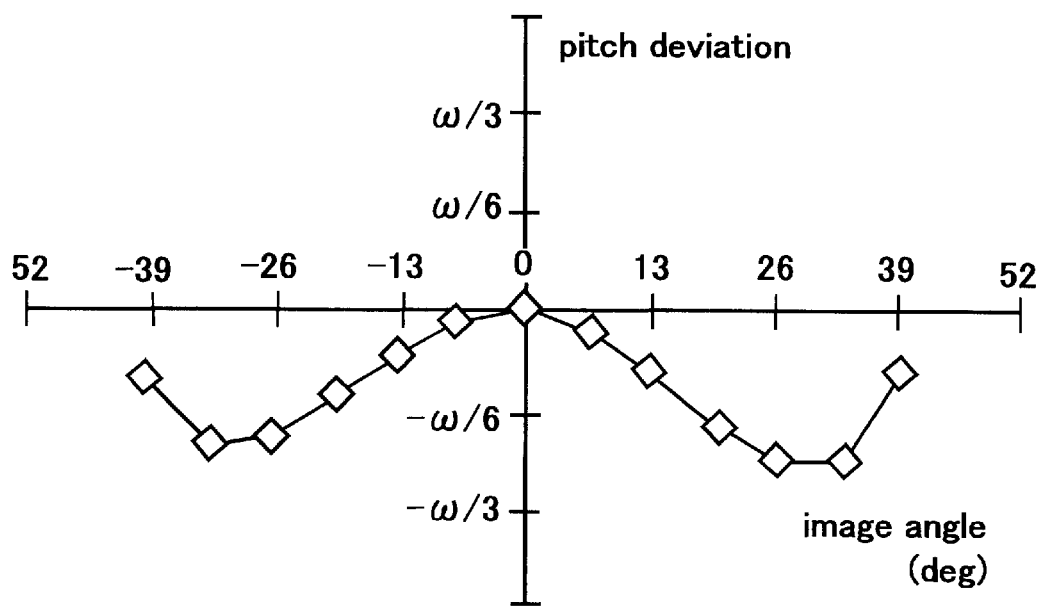

On the other hand, when the emerging optical axes of light fluxes from the light emitting parts 11a and 12a are in the 1B and 1C' or 1C and 1B' directions, the scanning lines scanned with optical spots formed by these two light fluxes are curved as indicated in FIG. 5(a), As illustrated, the curves are in a reversed relationship in the sub-scanning direction. In this case, the scanning line pitch difference for each image angle is as illustrated in FIG. 5(b), The scanning line pitch greatly changes according to the scanning position, and the scanning line pitch deviation is relatively large.

In the above description, the light emitting parts 11a and 12a are assumed to be in a substantially same sub-scanning cross section. However, the light emitting parts 11a and 12a may sometimes be dislocated in the main scanning direction relative to the optical axes of the corresponding coupling lenses. In such a case, the scanning line pitch deviation can be suppressed by configuring the light source unit so the emerging optical axes of the light fluxes, when projected in the sub-scanning cross section, are angled relative to the optical axes of the coupling lenses in a same direction.

In the embodiment illustrated in FIG. 1, under the condition of f1/f2=0.212, |β|=0.64 and the image angle of 39.2 degrees in one direction, when the optical axes of light fluxes emerging from the light emitting parts 11a and 12a are respectively angled at one degree in a same direction in the sub-scanning direction relative to the optical axes of the corresponding coupling lenses 13 and 14, the scanning line pitch deviation of ω/12 is generated, and when angled at 0.36 degrees in directions opposite to each other, the scanning line pitch deviation of ω/6 (a boundary beyond which human eyes can recognize the pitch deviation as uneven density).

In addition, the embodiment illustrated in FIGS. 1(a) and 1(b), under the condition of f1/f2=0.160, |β|=0.64 and the image angle in one direction of 39.2 degrees, when the optical axes of light fluxes emerging from the light emitting parts 11a and 12a are respectively angled at an angle of 0.32 degrees relative to the optical axis of the corresponding coupling lens in directions opposite to each other in the sub-scanning direction, the pitch deviation of ω/6.

From the above result, it can be determined that by configuring the emerging optical axis of a light flux from each light emitting part or a projecting shadow thereof sub-scanning cross section to have an angle relative to the optical axis of the corresponding coupling lens in a same direction with each other, the tolerance of the above angle relative to the pitch deviation can be made large.

The above described light source unit having a semiconductor laser array in which a plurality of light emitting parts are monolithically arranged so a plurality of diverging light fluxes emitted from the light emitting parts are coupled with a common coupling lens is preferable, because it can be easily configured so the emerging optical axis of each light flux has an angle relative to the optical axis of the corresponding coupling lens in a same direction.

Summarizing the above results, if an angle θ of the emerging optical axis or the projecting shadow thereof in the sub-scanning cross section of each light flux from a plurality of light emitting parts of a light source relative to the optical axis of the corresponding coupling lens in the sub-scanning direction satisfies the condition: (f2/f1)·|β|·2·|δ|<2.2 deg., uneven density recognizable by human eyes will not be generated. This is true even if the emerging optical axis or the projecting shadow thereof in the sub-scanning cross section of each light flux has an angle relative to the optical axis of the corresponding coupling lens in a direction opposite to each other.

In the above embodiment the description is with respect to a case where the number of the light emitting parts is 2. Obviously, the present invention can be applied where a light source unit has three or more light emitting parts. When the light source unit has three or more light emitting parts, uneven density recognizable by human eyes can be avoided by configuring the light source unit such that a largest one of the angles δ of the emerging optical axes or the projecting shadows thereof in the sub-scanning cross section of the emerging light fluxes relative to the optical axis of the corresponding coupling lens in the sub-scanning direction satisfies the condition: (f2/f1)·|β|·2·|δ|<2.2 deg. Again, this is true even if the emerging optical axes or the projecting shadows thereof in the sub-scanning cross section of the light fluxes from the light emitting parts are angled relative to the optical axes of the corresponding coupling lenses in directions opposite to each other.

Another feature of the present invention will now be described

As described above with reference to FIG. 3(a), it is preferable the direction of an optical axis of a light flux emerging from a light emitting part is parallel to the optical axis of a corresponding coupling lens. However, the emerging optical axis may be declined in the sub-scanning direction, for example, in the B direction as illustrated in FIG. 3(a), by an assembly or adjustment error of the semiconductor laser and corresponding coupling lens as described above.

In the embodiment illustrated in FIGS. 1(a) and 1(b), under the condition of f1/f2=0.212, |β|=0.64 and the image angle in one direction of 39.2 degrees, when the optical axes of light fluxes emerging from the light emitting parts 11a and 12a of the semiconductor lasers 11 and 12 are respectively angled at two degrees in a same direction in the sub-scanning direction relative to the optical axes of the respective corresponding coupling lenses 13 and 14, the scanning line pitch deviation of about ω/6 is generated, This pitch deviation is a boundary beyond which human eyes can recognize the pitch deviation as an uneven density.

Figure 6:
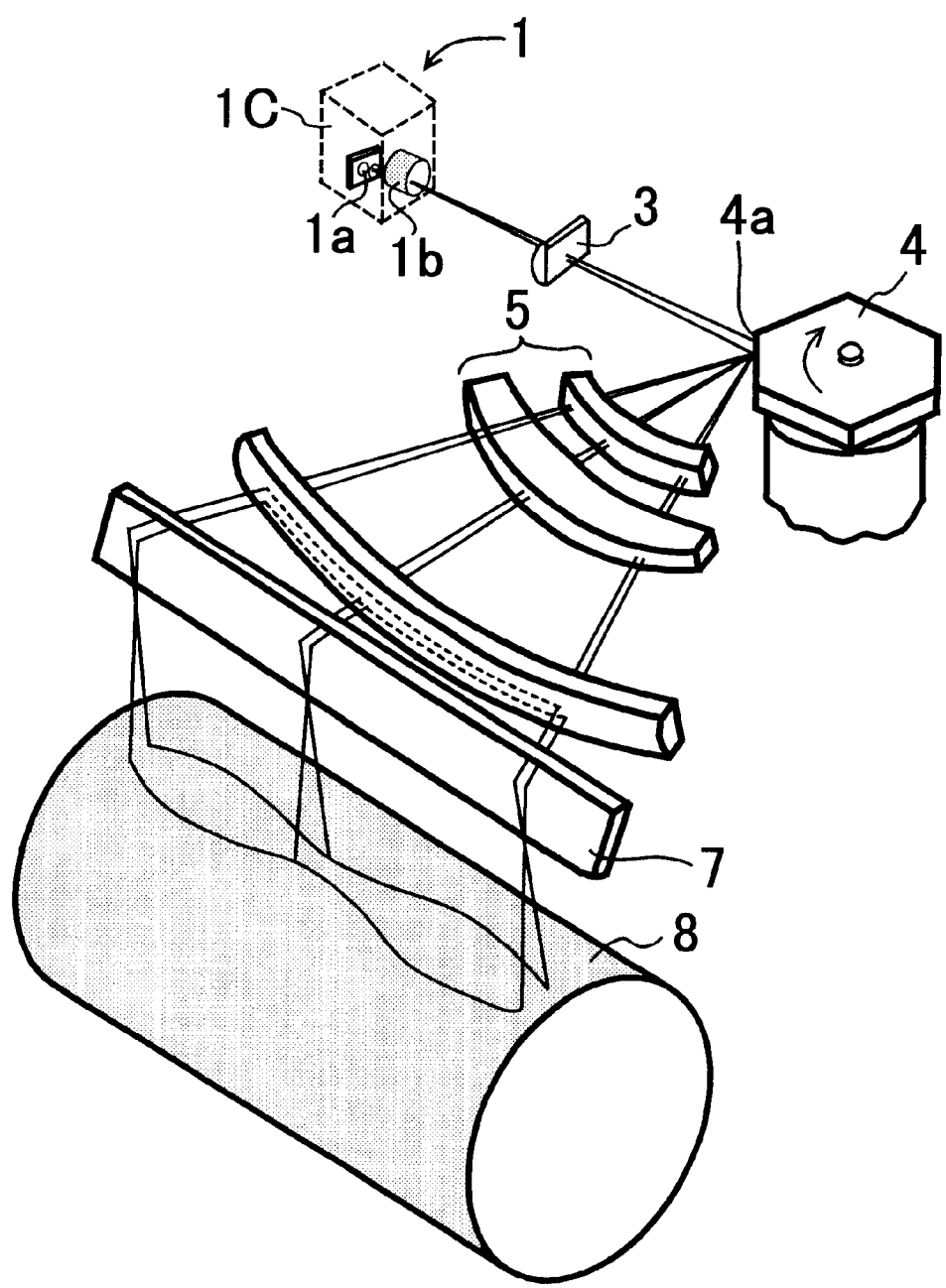
FIG. 6 is a schematic drawing illustrating a construction of an optical scanning apparatus according to another embodiment of the present invention.

FIG. 6 is a schematic drawing illustrating a construction of a multi-beam scanning *apparatus according to another embodiment of the present invention. In this embodiment, a light source apparatus is configured so the direction of an emerging optical axis of a light flux from; each light emitting part of a light source unit (i.e., the angle of an optical axis of the emerging light flux relative to an optical axis of a corresponding coupling lens) can be adjusted to reduce the scanning line pitch deviation, thereby enhancing the image quality.

In this embodiment, a light source apparatus 1 includes a plurality of light source units 1a arranged so optical spots formed by light fluxes from the light source units 1a are separated from each other at an equal interval in the sub-scanning direction on a surface to be scanned. The light source apparatus 1 also includes one or more coupling lenses 1b to couple divergent light fluxes from the light source units 1a and a rotating multi-faced mirror 4 as a deflector. Also included is an optical unit 1c as a base member to hold at least one light source unit 1a and one coupling lens 1b.

Figure 7A:
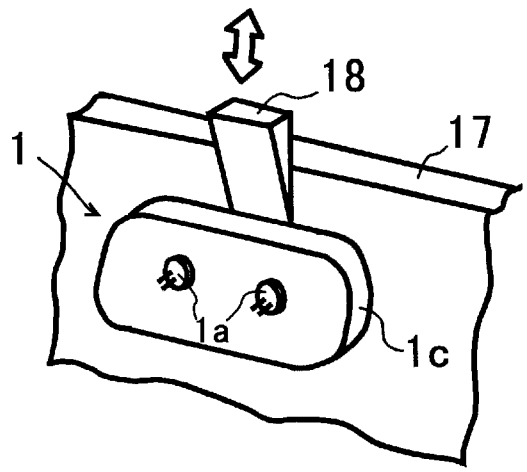
FIG. 7(a) is a schematic drawing illustrating an angle adjusting device for the optical scanning apparatus.

As illustrated in FIG. 7(a), the optical unit 1c is attached to an optical housing 17 of the optical scanning apparatus by being pressed to the housing 17 by an elastic member so the angle of the light source unit 1 relative to the optical housing 17 can be adjusted by an angle adjusting device in the sub-scanning direction. FIG. 7(a) illustrates a case where two light source units 1a are held on the optical unit 1c, and two coupling lenses 1b (not shown) are held on the optical unit 1c so as to correspond to the light source units 1a.

Figure 7B:
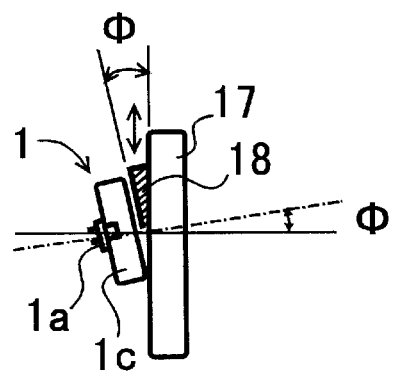
FIG. 7(b) is a section drawing of the angle adjusting device.

As illustrated in FIGS. 7(a) and 7(b), in the light source apparatus 1, a wedge-like-shaped member 18 is inserted between the optical unit 1c and the optical housing 17. The member 18 serves as an angle adjusting device for adjusting the angle of the optical unit 1c relative to the optical housing 17 in the sub-scanning direction. By adjusting an insertion amount of the wedge-like-shaped member 18 into a gap between the optical unit 1c and the optical housing 17, the angle of the optical unit 1c relative to the optical housing 17 can be adjusted to an arbitrary angle φ in the sub-scanning direction. Thereby, the direction of an emerging light flux from each light emitting part of the light source unit 11a (which is declined in the sub-scanning direction due to an of assembly or adjustment error) can be adjusted so the scanning line pitch deviation is reduced and uneven image density is suppressed to a level unrecognizable by human eyes.

Further, even if the declining angle of an emerging light flux from each light emitting part differs from each other, by adjusting the insertion amount of the wedge-like-shaped member 18 while measuring the scanning line pitch deviation, the angle of each emerging light flux declined in the sub-scanning direction can be adjusted in a similar manner so the scanning line pitch deviation is reduced and thereby uneven image density is suppressed to a level unrecognizable by human eyes.

In addition, in the above description, one piece of the wedge-like-shaped member 18 is inserted between the optical unit 1c and the optical housing 17. However, two or more pieces of the wedge-like-shaped member 18 can be inserted between the optical unit 1c and the optical housing 17 so the angle of the optical source unit 1a relative to the optical housing 17 can be adjusted from substantially a same direction or from two or more different directions. With the above configuration, the freedom in adjustment is increased and the adjustment can be made more precise.

Still further, the position of the light source unit 1a and the coupling lens 1b (i,e., the attaching position of the optical unit 1c) may be set in advance to one side from an adjusting criterion position so the angle of the optical unit 1c relative to the optical housing 17 can be adjusted to the above criterion position by adjusting the insertion amount of the wedge-like-shaped member 18. In this way, the adjusting direction is set to only one direction, and thereby the adjustment can be facilitated and the adjusting time can be shortened.

Figure 7C:
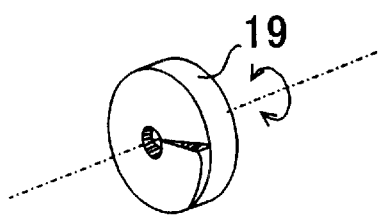
FIG. 7(c) is a schematic drawing illustrating another angle adjusting device.

Furthermore, although the wedge-like-shaped member 18 is used for the angle adjusting device in the above embodiment, any member having substantially the same function as the wedge-like-shaped member 18 may be used. For example, as illustrated in FIG. 7(c), a flat-surfaced cam 19 having a continuously changing thickness may be used. In this case, a part of the cam 19 is arranged between the optical unit 1c and the optical housing 17. By rotating the cam 19, the angle of the optical unit 1c relative to the optical housing 17 is adjusted to an arbitrary angle φ in the sub-scanning direction.

Figure 7D:
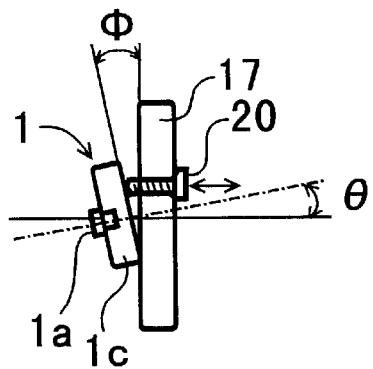
FIG. 7(d) is a schematic drawing illustrating still another angle adjusting device.

Also, as illustrated in FIG. 7(d), a screw-like-shaped member 20 may be screwed into the optical housing 17 toward the optical unit 1c so a tip end of the screw-liked-shaped member 20 abuts on the optical unit 1c. The angle of the optical unit 1c relative to the optical housing 17 can be adjusted to an arbitrary angle φ in the sub-scanning direction by adjusting the amount the screw-like shaped member 20 is turned toward the optical unit 1c. Any member having a substantially same fiction as the screw-like-shaped member 20, for example, a pin-like-shaped member, may be used in place of the member 20.

A light source apparatus according to the present invention may be used in an optical scanning apparatus of a laser printer or a laser copying machine. In the embodiments illustrated in FIGS. 7(a)–7(d), a plurality of the light source units 1a are mounted to the optical unit 1c as the base member, However, the optical unit 1c may be individually arranged for each light source unit 1a so the angle may be individually adjusted in the sub-scanning direction. Further, a light source apparatus may be configured so an angle of at least one optical source unit 1a can be individually adjusted in the sub-scanning direction and an angle of another optical source unit 1a can not be adjusted in the sub-scanning direction.

Figure 8:
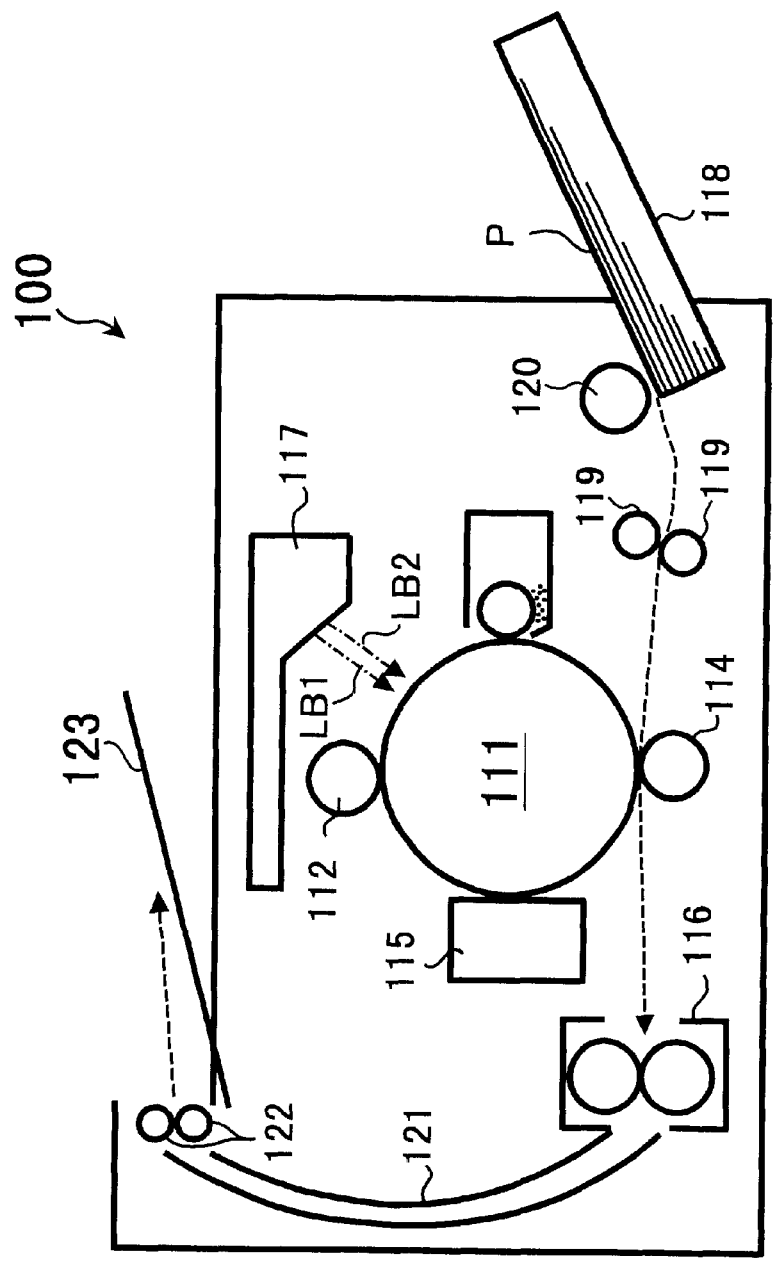
FIG. 8 is a schematic drawing illustrating a construction of an image forming apparatus according to an embodiment of the present invention.

FIG. 8 illustrates a construction of a laser printer as an image forming apparatus according to an embodiment of the present invention. A laser printer 100 includes a cylindrically shaped photoconductor as a latent image bearing member 111. Arranged around the latent image bearing member 111, is a charging roller 112, a developing device 113, a transfer roller 114, and a cleaning device 115a. A corona charger can be also used as a charging device.

Further, a multi-beam scanning apparatus 117 employing a two beam scanning method with laser light fluxes LB1 and LB2 is provided to perform an exposure by optical writing between the charging roller 112 and the developing device 113. In FIG. 8, numerals 116 denote a fixing device, 118 a sheet cassette, 119 a pair of registration rollers, 120 a sheet feeding roller, 121 a sheet conveying path, 123 a tray and P a transfer sheet as a recording medium. The multi-beam scanning apparatus 117 has been described above with reference to FIGS. 1(a) through 7(d).

When forming an image, the latent image bearing member 111 is rotated at a constant velocity in a clockwise direction. The surface of the latent image bearing member 111 is uniformly charged by the charging roller 112 and is then exposed by the laser light fluxes LB1 and LB2 of the multi-beam scanning apparatus 117. Thereby, an electrostatic latent image is formed on the surface of the latent image being member 111. The portion of the latent image bearing member 111 corresponding to the image portion of an image is exposed and therefore the electrostatic latent image is a so-called negative image. The electrostatic latent image is then developed by the developing device 113. Thereby, a toner image is formed on the latent image bearing member 111.

The cassette 118 containing the transfer sheet P is detachable from the main body of the image forming apparatus 100. In the attached condition as illustrated in FIG. 8, an uppermost sheet of the transfer sheet P is fed out by the feeding roller 120, and the fed transfer sheet P is nipped by the registration rollers pair 119 at its leading end. The registration roller pair 119 feeds the transfer sheet P to a transfer part of the apparatus 100 at a timing synchronized with the toner image on the latent image bearing member 111 reaching the transfer part. At the transfer part, the transfer sheet P contacts the latent image bearing member 111 and the toner image is electrostatically transferred to the transfer sheet P. The transfer sheet P is then conveyed to the fixing device 116, where the toner image is fixed to the transfer sheet P. The transfer sheet P is then conveyed through the conveying path 121 and is discharged to the tray 123 by the exit roller pair 122.

After the toner image is transferred to the transfer sheet P, the surface of the latent image bearing member 111 is cleaned by the cleaning device 115 and residual toner and paper dust is removed.

A silver salt photographic film may also be used as the latent image bearing member 111. When a silver salt photographic film is used as the latent image bearing member 111, a latent image formed by optical scanning with an optical scanning apparatus is developed with a silver salt photographic developing system An image forming apparatus using such a photographic film is practiced as a plate maker.

Further, a sheet-shaped photoconductive member such as a zinc oxide sheet may be used as tie latent image bearing member 111. In this case, the sheet latent image bearing member serves as a recording medium, and a developed toner image is fixed thereupon.

Furthermore, a latent image formed on the latent image bearing member 111 may be transferred onto an intermediate transferring member such as a belt-like shaped member, so the latent image is developed into a toner image on the intermediate transferring member and is then transferred to a recording medium from the intermediate transferring member.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Applications No. 11-185800 and No. 11-306478 filed in the Japanese Patent Office on Jun. 30, 1999 and Oct. 28, 1999, respectively, and the entire contents of which are hereby incorporated by reference.

What is claimed as new and is desired to be secured by Letter Patent of the United State is:

1. A multi-beam scanning apparatus, comprising:
   a light source unit having a plurality of light emitting parts configured to emit a plurality of divergent light fluxes;
   a deflector configured to deflect the plurality of divergent light fluxes emitted from the light source unit; and
   an imaging system configured to couple the plurality of divergent light fluxes from the light source unit with the deflector and to condense the deflected plurality of light fluxes into optical spots on a surface to be scanned,
   wherein the light source unit is configured so the optical spots are separated from each other in a sub-scanning direction on the surface to be scanned, and
   wherein optical axes of the light fluxes emitted from the plurality of light emitting parts are angled in a substantially same direction in the sub-scanning direction relative to optical axes of at least one coupling lens configured to couple the plurality of divergent light fluxes.

2. A multi-beam scanning apparatus according to claim 1, wherein the at least one coupling lens includes a plurality of coupling lenses respectively corresponding to the plurality of light emitting parts and configured to couple the divergent light fluxes emitted from the light source unit.

3. A multi-beam scanning apparatus according to claim 1, wherein a part of the imaging system located between the deflector and the face to be scanned includes an anamorphic lens having refractive indexes different in a main scanning direction and in the sub-scanning direction.

4. A multi-beam scanning apparatus according to claim 1, wherein the deflector comprises a rotating multi-faced mirror.

5. A multi-beam scanning apparatus according to claim 1, wherein the light source unit has two light emitting parts.

6. A multi-beam scanning apparatus comprising:
a light source unit having a plurality of light emitting parts configured to emit a plurality of divergent light fluxes;
a deflector configured to deflect the plurality of divergent light fluxes emitted from the light source unit; and
an imaging system configured to couple the plurality of divergent light fluxes from the light source unit with the deflector and to condense the deflected plurality of light fluxes into optical spots on a surface to be scanned,
wherein the light source unit is configured so the optical spots are separated from each other in a sub-scanning direction on the surface to be scanned, and
wherein optical axes of light fluxes emitted from the plurality of emitting parts in a sub-scanning cross section are angled in a substantially same direction in the sub-scanning direction relative to optical axes of at least one coupling lens configured to couple the plurality of divergent light fluxes.

7. A multi-beam scanning apparatus according to claim 6, wherein the at least one coupling lens includes a plurality of coupling lenses respectively corresponding to the plurality of light emitting parts and configured to couple the divergent light, fluxes emitted from the light source unit.

8. A multi-beam scanning apparatus according to claim 6, wherein a part of the imaging system located between the deflector and the surface to be scanned includes an anamorphic lens having refractive indexes different in a main scanning direction and in the sub-scanning direction.

9. A multi-beam scanning apparatus according to claim 6, wherein the deflector comprises a rotating multi-faced mirror.

10. A multi-beam scanning apparatus according to claim 6, wherein the light source unit has two light emitting parts.

11. A multi-beam scanning apparatus, comprising:
a light source unit having a plurality of light emitting parts configured to emit a plurality of divergent light fluxes;
a deflector configured to deflect the plurality of divergent light fluxes emitted from the light source unit; and
an imaging system configured to couple the plurality of divergent light fluxes from the light source unit with the deflector and to condense the deflected plurality of light fluxes into optical spots on a surface to be scanned,
wherein the light source unit is configured so the optical spots are separated from each other in a sub-scanning direction on the surface to be scanned,
wherein the imaging system includes a first imaging system configured to couple and guide the plurality of diverging light fluxes from the light source unit to the deflector and a second imaging system configured to condense the plurality of light fluxes deflected by the deflector into the optical spots on the surface to be scanned,
wherein the first imaging system includes at least one coupling lens configured to couple each divergent light flux from the light source unit and at least one line image forming system configured to image each coupled light flux in a line image elongated in a main scanning direction in a vicinity of a deflecting reflective surface of the deflector, and
wherein the following equation is satisfied:

$$(f2/f1)\cdot|\beta|\cdot 2\cdot|\delta|<2.2 \text{ (degrees)},$$

where
f1 is a focal distance of the at least coupling lens of the first imaging system,
f2 is a focal distance of the at least one line image forming system,
$\beta$ is an imaging lateral magnification ratio of the second imaging system in the sub-scanning direction, and
$\delta$ is an angle formed by an optical axis of each light flux emitted from the plurality of light emitting parts in a sub-scanning cross section and an optical axis of the at least one coupling lens,
wherein optical axes of light fluxes emitted from the plurality of emitting parts in a sub-scanning cross section are angled in a substantially same direction in the sub-scanning direction relative to optical axes of the at least one coupling lens.

12. A multi-beam scanning apparatus according to claim 11, wherein the at least one coupling lens includes a plurality of coupling lenses respectively corresponding to the plurality of light emitting parts and configured to couple the divergent light fluxes emitted from the light source unit.

13. A multi-beam scanning apparatus according to claim 11, wherein a part of the imaging system located between the deflector and the surface to be scanned includes an anamorphic lens having refractive indexes different in a main scanning direction and in the sub-scanning direction.

14. A multi-beam scanning apparatus according to claim 11, wherein the deflector comprises a rotating multi-faced mirror.

15. A multi-beam scanning apparatus according to claim 11, wherein the light source unit has two light emitting parts.

16. An image forming apparatus comprising:
a latent image bearing member configured to bear an image; and
a multi-beam scanning apparatus including:
a light source unit having a plurality of light emitting parts configured to emit a plurality of divergent light fluxes;
a deflector configured to deflect the plurality of divergent light fluxes emitted from the light source unit; and
an imaging system configured to couple the plurality of divergent light fluxes from the light source unit with the deflector and to condense the deflected plurality of light fluxes into optical spots on a surface to be scanned of the latent image bearing member,
wherein the light source unit is configured so the optical spots are separated from each other in a sub-scanning direction on the surface to be scanned, and
wherein optical axes of the light fluxes emitted from the plurality of light emitting parts are angled in a substantially same direction in the sub-scanning direction relative to optical axes of at least one coupling lens configured to couple the plurality of divergent light fluxes.

17. An image forming apparatus according to claim 16, wherein the at least one coupling lens includes a plurality of coupling lenses respectively corresponding to the plurality of light emitting parts and configured to couple the divergent light fluxes emitted from the light source unit.

18. An image forming apparatus according to claim 16, wherein a part of the imaging system located between the deflector and the surface to be scanned includes an anamorphic lens having refractive indexes different in a main scanning direction and in the sub-scanning direction.

19. An image forming apparatus according to claim 16, wherein the deflector comprises a rotating multi-faced mirror.

20. An image forming apparatus according to claim 16, wherein the light source unit has two light emitting parts.

21. An image forming apparatus according to claim 16, wherein the latent image bearing member comprises a photoconductor, and
wherein the latent image is formed on the latent image bearing member by optical scanning after uniformly charging the latent image bearing member, is developed with toner into a toner image, and the toner image is fixed on a recording medium as an image.

22. An image forming apparatus comprising:
a latent image bearing member; and
a multi-beam scanning apparatus including:
a light source unit having a plurality of light emitting parts configured to emit a plurality of divergent light fluxes;
a deflector configured to deflect the plurality of divergent light fluxes emitted from the light source unit; and
an imaging system configured to couple the plurality of divergent light fluxes from the light source unit with the deflector and to condense the deflected plurality of light fluxes into optical spots on a surface to be scanned,
wherein the light source unit is configured so the optical spots are separated from each other in a sub-scanning direction on the surface to be scanned, and
wherein optical axes of light fluxes emitted from the plurality of emitting parts in a sub-scanning cross section are angled in a substantially same direction in the sub-scanning direction relative to optical axes of at least one coupling lens configured to couple the plurality of divergent light fluxes.

23. An image forming apparatus according to claim 22, wherein the at least one coupling lens includes a plurality of coupling lenses respectively corresponding to the plurality of light emitting parts and configured to couple the divergent light fluxes emitted from the light source unit.

24. An image forming apparatus according to claim 22, wherein a part of the imaging system located between the deflector and the surface to be scanned includes an anamorphic lens having refractive indexes different in a main scanning direction and in the sub-scanning direction.

25. An image forming apparatus according to claim 22, wherein the deflector comprises a rotating multi-faced mirror.

26. An image forming apparatus according to claim 22, wherein the light source unit has two light emitting parts.

27. An image forming apparatus according to claim 22, wherein the latent image bearing member comprises a photoconductor, and
wherein the latent image is formed on the latent image bearing member by optical scanning after uniformly charging the latent image bearing member, is developed with toner into a toner image, and the toner image is fixed on a recording medium as an image.

28. An image forming apparatus comprising:
a latent image bearing member; and
a multi-beam scanning apparatus including:
a light source unit having a plurality of light emitting parts configured to emit a plurality of divergent light fluxes;
a deflector configured to deflect the plurality of divergent light fluxes emitted from the light source unit; and
an imaging system configured to couple the plurality of divergent light fluxes from the light source unit with the deflector and to condense the deflected plurality of light fluxes into optical spots on a surface to be scanned,
wherein the light source unit is configured so the optical spots are separated from each other in a sub-scanning direction on the surface to be scanned,
wherein the imaging system includes a first imaging system configured to couple and guide the plurality of diverging light fluxes from the light source unit to the deflector and a second imaging system configured to condense the plurality of light fluxes deflected by the deflector into the optical spots on the surface to be scanned,
wherein the first imaging system includes at least one coupling lens configured to couple each divergent light flux from the light source unit and at least one line image forming system configured to image each coupled light flux in a line image elongated in a main scanning direction in a vicinity of a deflecting reflective surface of from the deflector, and
wherein the following equation is satisfied:

$$(f2/f1) \cdot |\beta| \cdot 2 \cdot |\delta| < 2.2 \text{ (deg)},$$

where
f1 is a focal distance of the at least coupling lens of the first imaging system,
f2 is a focal distance of the at least line image forming system,
$\beta$ is an imaging lateral magnification ratio of the second imaging system in the sub-scanning direction, and
$\delta$ is an angle formed by a projecting shadow of an emerging optical axis of each light flux emitted from the plurality of light emitting parts in a sub-scanning cross section and an optical axis of the at least one coupling lens,
wherein optical axes of light fluxes emitted from the plurality of emitting parts in a sub-scanning cross section are angled in a substantially same direction in the sub-scanning direction relative to optical axes of the at least one coupling lens.

29. An image forming apparatus according to claim 28, wherein the at least one coupling lens includes a plurality of coupling lenses respectively corresponding to the plurality of light emitting parts and configured to couple the divergent light fluxes emitted from the light source unit.

30. An image forming apparatus according to claim 28, wherein a part of the imaging system located between the deflector and the surface to be scanned includes an anamorphic lens having refractive indexes different in a main scanning direction and in the sub-scanning direction.

31. An image forming apparatus according to claim 28, wherein the deflector comprises a rotating multi-faced mirror.

32. An image forming apparatus according to claim 28, wherein the light source unit has two light emitting parts.

33. An image forming apparatus according to claim 28, wherein the latent image bearing member comprises a photoconductor, and
wherein the latent image is formed on the latent image bearing member by optical scanning after uniformly charging the latent image bearing member, is developed with toner into a toner image, and the toner image is fixed on a recording medium as an image.

34. A light source apparatus for an optical scanning apparatus to deflect a divergent light flux from the light source apparatus with a deflector and image the deflected light flux into an optical spot on a surface to be scanned with an imaging system, the apparatus comprising:
- a light source unit having a plurality of light emitting parts arranged so optical spots formed by the light source unit on the surface to be scanned are spaced from each other at an equal interval in a sub-scanning direction;
- a coupling lens configured to couple the divergent light flux from each light emitting part with the deflector;
- a base member configured to support at least one of the light emitting parts and the coupling lens; and
- an angle adjusting device configured to adjust an angle of the optical source apparatus relative to an optical axis of the coupling lens in the sub-scanning direction,
- wherein optical axes of light fluxes emitted from the plurality of emitting parts in a sub-scanning cross section are angled in a substantially same direction in the sub-scanning direction relative to optical axes of the coupling lens.

35. A light source apparatus according to claim 34, wherein the angle adjusting device includes a wedge-shaped member, and the angle is adjusted by the wedge-shaped member.

36. A light source apparatus according to claim 34, wherein the angle adjusting device includes a flat-surfaced cam having a continuously changing thickness, and the angle is adjusted by the flat-surfaced cam.

37. A light source apparatus according to claim 34, wherein the angle adjusting device includes a screw-shaped member, and the angle is adjusted by the screw-shaped member.

38. A light source apparatus according to claim 34, wherein the angle is adjusted from at least two or more directions.

39. A light source apparatus according to claim 34, wherein a position of at least one of the light emitting parts and the coupling lens is adjusted to one side from a criterion adjusting position, and the angle is adjusted from the criterion position.

40. An optical scanning apparatus, comprising:
- a light source apparatus including:
  - a light source unit having a plurality of light emitting parts arranged so optical spots formed by the light source unit on the surface to be scanned are spaced from each other at an equal interval in a sub-scanning direction;
  - a coupling lens configured to couple the divergent light fluxes from the light emitting parts with the deflector;
  - a base member configured to support at least one of the light emitting parts and the coupling lens; and
  - an angle adjusting device configured to adjust an angle of the optical source apparatus relative to an optical axis of the coupling lens in the sub-scanning direction,
- wherein optical axes of light fluxes emitted from the plurality of emitting parts in a sub-scanning cross section are angled in a substantially same direction in the sub-scanning direction relative to optical axes of the coupling lens.

41. An optical scanning apparatus according to claim 40, wherein the angle adjusting device includes a wedge-shaped member, and the angle is adjusted by the wedge-shaped member.

42. An optical scanning apparatus according to claim 40, wherein the angle adjusting device includes a flat-surfaced cam having a continuously changing thickness, and the angle is adjusted by the flat-surfaced cam.

43. An optical scanning apparatus according to claim 40, wherein the angle adjusting device includes a screw-shaped member, and the angle is adjusted by the screw-shaped member.

44. An optical scanning apparatus according to claim 40, wherein the angle is adjusted from at least two or more directions.

45. An optical scanning apparatus according to claim 40, wherein a position of at least one of the light emitting parts and the coupling lens is adjusted to one side from a criterion adjusting position, and the angle is adjusted from the criterion position.

46. An optical scanning apparatus according to claim 40, wherein the imaging system includes one or more anamorphic lenses having refractive indexes different in main and sub-scanning directions.

47. An image forming apparatus comprising:
- an optical scanning apparatus including:
  - a light source apparatus having:
    - a light source unit having a plurality of light emitting parts arranged so optical spots formed by the light source unit on a surface to be scanned are spaced from each other at an equal interval in a sub-scanning direction;
    - a coupling lens configured to couple the divergent light flux from each light emitting part with the deflector;
    - a base member configured to support at least one of the light emitting parts and at least one of the coupling lens; and
    - an angle adjusting device configured to adjust an angle of the optical source apparatus relative to an optical axis of the coupling lens in the sub-scanning direction,
  - wherein optical axes of light fluxes emitted from the plurality of emitting parts in a sub-scanning cross section are angled in a substantially same direction in the sub-scanning direction relative to optical axes of the coupling lens.

48. An image forming apparatus according to claim 47, wherein the angle adjusting device includes a wedge-shaped member, and the angle is adjusted by the wedge-shaped member.

49. An image forming apparatus according to claim 47, wherein the angle adjusting device includes a flat-surfaced cam having a continuously changing thickness, and the angle is adjusted by the flat-surfaced cam.

50. An image forming apparatus according to claim 47, wherein the angle adjusting device includes a screw-shaped member, and the angle is adjusted by the screw-shaped member.

51. An image forming apparatus according to claim 47, wherein the angle is adjusted from at least two or more directions.

52. An image forming apparatus according to claim 47, wherein a position of at least one of the light emitting part and the coupling lens is adjusted to one side from a criterion adjusting position, and the angle is adjusted from the criterion position.

53. An image forming apparatus according to claim 47, wherein the imaging system includes one or more anamorphic leases having refractive indexes different in main and sub-scanning directions.

* * * * *